Oct. 4, 1927.　　　　　A. YANCEY　　　　　1,644,457

PRESERVING GASKET

Filed Nov. 4, 1925

INVENTOR

ATTORNEY

Patented Oct. 4, 1927.

1,644,457

UNITED STATES PATENT OFFICE.

ARTHUR YANCEY, OF NEW ORLEANS, LOUISIANA.

PRESERVING GASKET.

Application filed November 4, 1925. Serial No. 66,759.

The invention relates to improvements in gaskets for sealing preserving containers and caps.

The principal objects of the invention are: first, to provide an improved longitudinally elastic gasket which, when stretched, attenuated and sprung to its seat, will adjust for surface contact over angularly disposed zones on both cap and container; second, to provide a double seal positioned on angularly disposed surfaces to prevent injury to the seal resulting from slippage caused by ageing and expansion of the gasket material; third, to reduce the amount of rubber required and the cost of gaskets.

For the purpose of disclosure, a simple form of the invention is herein described and illustrated in the accompanying drawing, in which—

Figure 1:
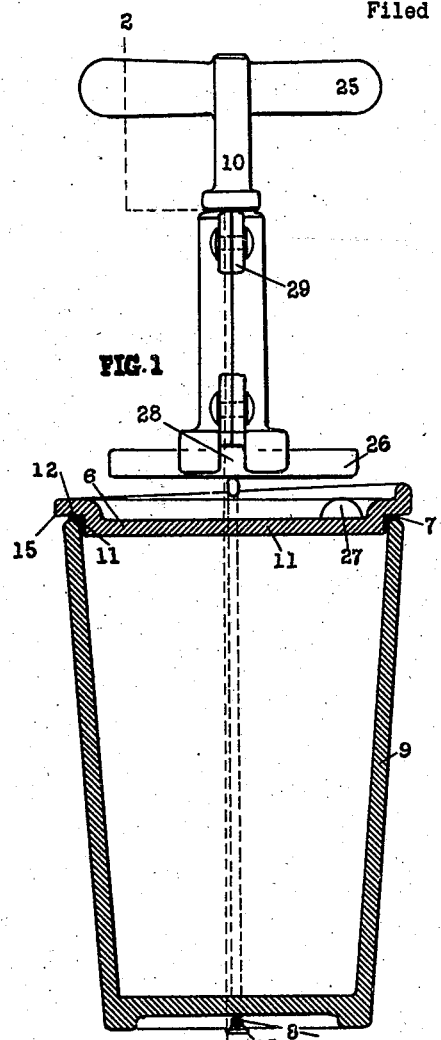
Fig. 1 is a view and section on the line 1—1, Fig. 2, of a preserving cap, gasket, container and other parts hereinafter described.
Figure 2:
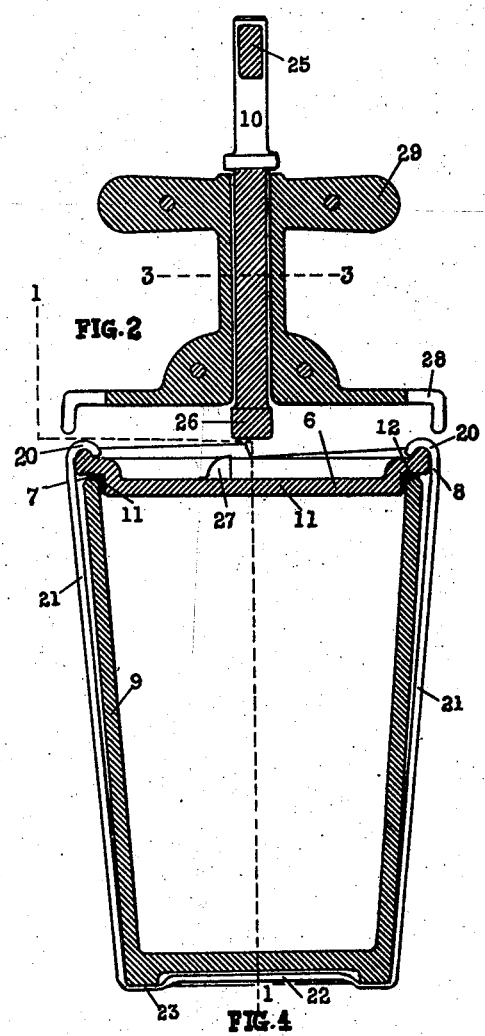
Fig. 2 is a section on the line 2—2, Fig. 1, of the same.
Figure 3:
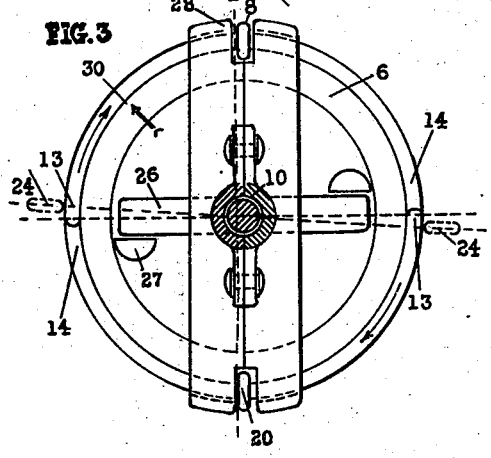
Fig. 3 is a section and view on the line 3—3, Fig. 2, of the same.
Figure 4:
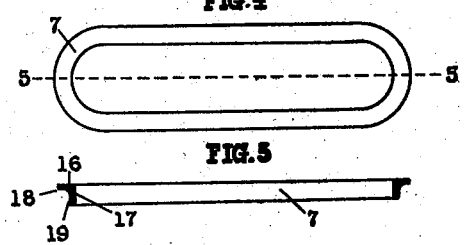
Fig. 4 is a view of an endless band-like gasket having an L shaped cross section, and capable of being stretched and attenuated.
Figure 5:
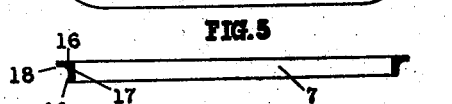
Fig. 5 is a section on the line 5—5, Fig. 4, of the same.

The preserving cap 6 (Figs. 1, 2 and 3) is provided with angularly disposed surfaces 11 and 12 intersecting at approximately right angles. Zones contiguous to the intersection of these surfaces comprise a seat for the gasket 7 (Figs. 4 and 5) which is made of a strip of rubber, of substantially L shaped cross section and having edges of equal length, the extremities being joined to form an endless band.

The length of the gasket is made considerably less than the perimeter of its seat, so that when it is stretched, attenuated and sprung in place on the cap, the angularly disposed surfaces 16 and 17 (Fig. 5) are drawn into surface contact, by the tension produced in the gasket, over the aforesaid zones of the cap, and the outer surfaces 18 and 19 (Figs. 4 and 5) likewise adjust for surface contact over angularly disposed zones of the container.

The foregoing discloses the principal features of the invention and the following shows parts involving these features in co-operation with other parts to which no claim is made.

6 is the cap, 7 the gasket, 8 a tie to fasten the cap to the container 9, and 10 is an operating wrench or key.

The cap is provided with a gasket seat formed by the angularly disposed members 11 and 12. Circumferential clamping edges beginning at low points 13 gradually rise to high points 14. A slight overhang 15 extending over the rim of the container facilitates prying the cap for removal.

When the gasket is stretched and sprung in place, parts 16 and 17 mate with angularly disposed surfaces on the cap, and parts 18 and 19 are thereby adjusted for mating with angularly disposed surfaces on the container.

The tie may consist of a single piece of wire having its ends formed into hooks 20 which are adapted to fit the inclined ridges of the cap aforesaid.

The intervening length of the tie conforms to the shape of the container as at 21 and to the concavity of the bottom as at 22. The wire is flattened as shown at 23 for upright setting of the container, and the hooks spring apart normally to the position as shown at 24, but are easily pressed inwardly as shown for engagement with the ridges.

The key consists of a handle 25 and a holder 26 adapted to engage the buttons 27 of the cap and to hold the latter while the turner 28, with the handle 29, is made to engage the hooks of the tie and to cause them to travel up the inclined ridges of the cap, thereby sealing the cap and container.

It is frequently desired in preserving to have the container cap temporarily non-airtight, yet with the cap in place. The desired condition may be obtained by turning the aforesaid hooks to a point, the position of which has been predetermined, conveniently as indicated by an arrow such as shown at 30 and permanently moulded in the glass cap.

I claim and desire to protect by Letters Patent:

1. A closure having a gasket seat comprising two angularly disposed parts in combination with an elastic gasket stretched originally before use as a flat layer upon both of the angularly disposed parts and defining on said seat two elastic walls at an angle to each other, said gasket normally, when unapplied to said seat, having a periphery differing in shape from the periphery of the gasket seat, said gasket being held in original engagement with the said angularly disposed parts by the tendency of the stretched gasket to contract upon the gasket seat.

2. An elastic gasket for a closure having in its unstretched state a periphery dissimilar in shape to the seat for which it is intended, and having two spaced angularly disposed intersecting walls.

3. An elastic gasket for a closure comprising a closed strip of elastic material which in its normal state comprises two substantially parallel members which are joined at their ends to form the closed strip, the said strip being formed of two walls intersecting each other at an angle.

4. An elastic gasket for sealing a container comprising an elliptically shaped elastic strip, said strip having peripheral walls at an angle to each other.

ARTHUR YANCEY.